US008738411B2

(12) United States Patent
Agarwal et al.

(10) Patent No.: US 8,738,411 B2
(45) Date of Patent: May 27, 2014

(54) OPTIMIZING SERVICE DELIVERY SYSTEMS

(75) Inventors: Shivali Agarwal, Ghaziabad (IN); Saeed Bagheri, Croton on Hudson, NY (US); Jarir K. Chaar, Ardsley, NY (US); Krishna C. Ratakonda, Yorktown Heights, NY (US); Bikram Sengupta, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 316 days.

(21) Appl. No.: 13/098,987

(22) Filed: May 2, 2011

(65) Prior Publication Data

US 2012/0284076 A1 Nov. 8, 2012

(51) Int. Cl.
*G06Q 10/00* (2012.01)

(52) U.S. Cl.
USPC .......................................................... 705/7.13

(58) Field of Classification Search
USPC .......................................................... 705/7.13
See application file for complete search history.

(56) References Cited

U.S. PATENT DOCUMENTS

| | | | | |
|---|---|---|---|---|
| 5,408,663 | A | 4/1995 | Miller | |
| 5,963,911 | A | 10/1999 | Walker et al. | |
| 6,275,812 | B1 * | 8/2001 | Haq et al. | 705/7.14 |
| 6,732,079 | B1 * | 5/2004 | Kintner et al. | 705/7.13 |
| 7,599,841 | B1 * | 10/2009 | Koller et al. | 705/320 |
| 2010/0153161 | A1 * | 6/2010 | Kiran et al. | 705/8 |

OTHER PUBLICATIONS

P. L'Ecuyer, "Modeling and Optimization Problems in Contact Centers", Proceedings of the 3rd International Conference on the Quantitative Evaluation of Systems, 2006.*

E. Hans, Phd, "Resource Loading by Branch and Price Techniques," Thesis, Beta Research School for Operations Management and Logistics, 2001, Twente University Press, Enschede, The Netherlands.

Y. Lu et al. "Workforce Management and Optimization Using Stochastic Network Models", IEEE International Conference on Service Operations and Logistics, and Informatics, Jun. 2006.

R. Baskerville et al., "Enterprise Resource Planning and Organizational Knowledge: Patterns of Convergence and Divergence", Proceedings of the Twenty First International Conference on Information Systems, 2000.

E. Bernroider et al., "Decision Making for ERP-Investments From the Perspective of Organizational Impact—Preliminary Results From an Empirical Study", Proceedings of the Fifth Americas Conference on Information Systems, 1999.

C. Poirier, "Forecasting, Demand Management and Capacity Planning".

* cited by examiner

*Primary Examiner* — David Rines
*Assistant Examiner* — Amanda Gurski
(74) *Attorney, Agent, or Firm* — John R. Pivnichny; Law Office of Jim Boice

(57) ABSTRACT

A computer implemented method, system and/or computer program product optimizes a service delivery system. A processor receives a first set of inputs that describes a current state of a service delivery system and a second set of inputs that describes a cost overhead for the service delivery system. The processor then optimizes the service delivery system in order to derive an optimized service delivery system.

19 Claims, 2 Drawing Sheets

OPTIMIZING SERVICE DELIVERY SYSTEMS

BACKGROUND

The present disclosure relates to the field of computers, and specifically to the use of computers in the field of service delivery. Still more particularly, the present disclosure relates to the use of computers in managing human resources used by service delivery systems.

A Service Delivery (SD) system offers a set of services to end-users. For example, an application service provider may offer services like application development, application maintenance, application testing, application integration, etc. Each service area may itself offer finer-grained services and be considered a SD system by itself, for example, application development service may consist of a first language application development service, a second language application development service, etc. A SD system may be characterized at any point of time by the distribution of resources over the various services that it offers. Over time, as market conditions change, an existing SD system may need to be transformed, by retiring some existing service areas and opening new ones, hiring new skills and training resources in new service areas.

BRIEF SUMMARY

A computer implemented method, system and/or computer program product optimizes a service delivery system. A processor receives a first set of inputs that describes a current state of a service delivery system and a second set of inputs that describes a cost overhead for the service delivery system. The processor then optimizes the service delivery system in order to derive an optimized service delivery system.

DETAILED DESCRIPTION

Figure 1:
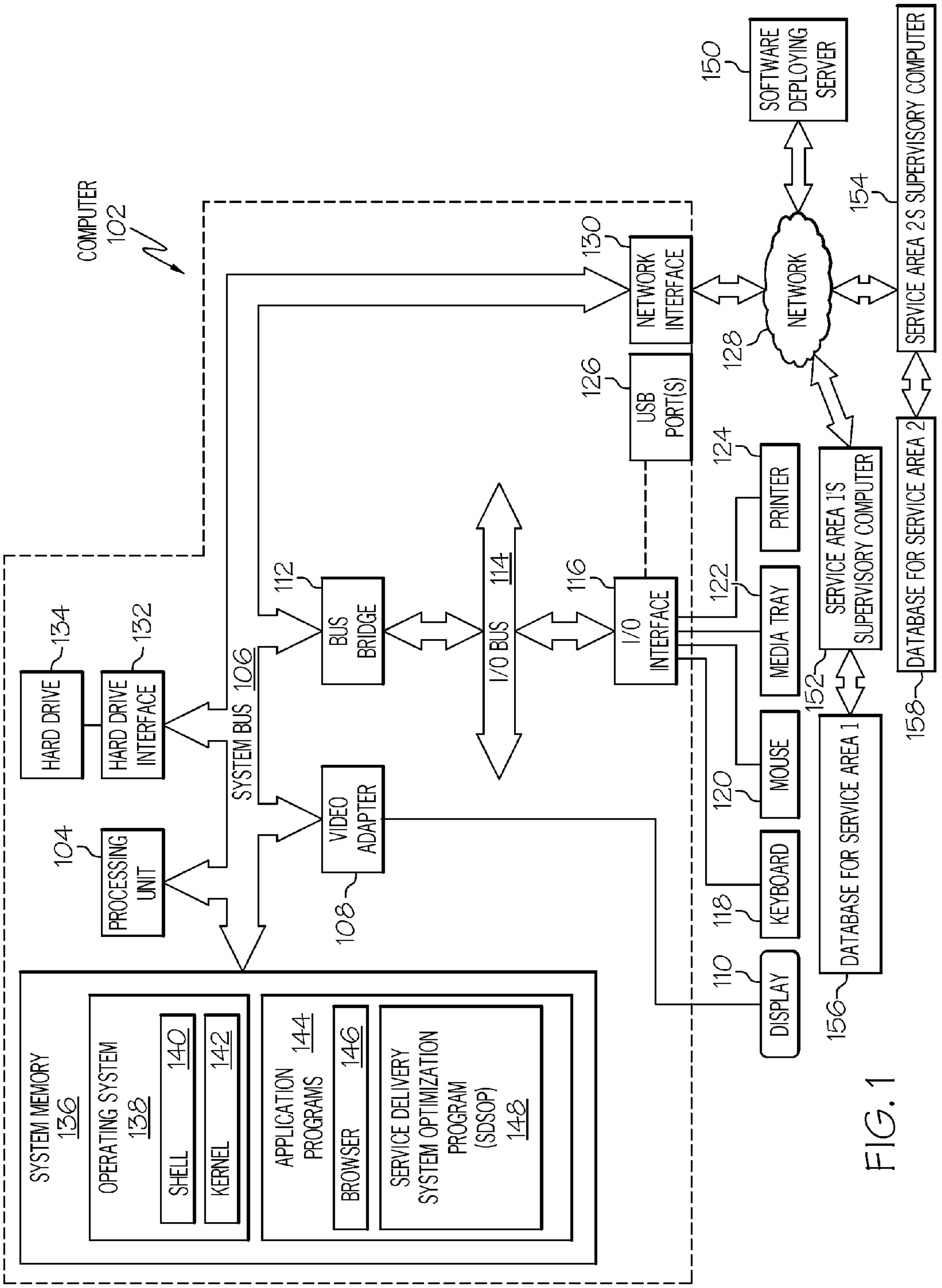
FIG. 1 depicts an exemplary computer in which the present disclosure may be implemented.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including, but not limited to, wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

With reference now to the figures, and in particular to FIG. 1, there is depicted a block diagram of an exemplary computer 102, which may be utilized by the present invention. Note that some or all of the exemplary architecture, including both depicted hardware and software, shown for and within computer 102 may be utilized by software deploying server 150, service area 1's supervisory computer 152, and service area 2's supervisory computer 154.

Computer 102 includes a processing unit 104 that is coupled to a system bus 106. Processing unit 104 may utilize one or more processors, each of which has one or more processor cores. A video adapter 108, which drives/supports a display 110, is also coupled to system bus 106. System bus 106 is coupled via a bus bridge 112 to an input/output (I/O) bus 114. An I/O interface 116 is coupled to I/O bus 114. I/O interface 116 affords communication with various I/O devices, including a keyboard 118, a mouse 120, a media tray 122 (which may include storage devices such as CD-ROM drives, multi-media interfaces, etc.), a printer 124, and external USB port(s) 126. While the format of the ports connected to I/O interface 116 may be any known to those skilled in the art of computer architecture, in one embodiment some or all of these ports are universal serial bus (USB) ports.

As depicted, computer 102 is able to communicate with a software deploying server 150 using a network interface 130. Network 128 may be an external network such as the Internet, or an internal network such as an Ethernet or a virtual private network (VPN).

A hard drive interface 132 is also coupled to system bus 106. Hard drive interface 132 interfaces with a hard drive 134. In one embodiment, hard drive 134 populates a system memory 136, which is also coupled to system bus 106. System memory is defined as a lowest level of volatile memory in computer 102. This volatile memory includes additional higher levels of volatile memory (not shown), including, but not limited to, cache memory, registers and buffers. Data that populates system memory 136 includes computer 102's operating system (OS) 138 and application programs 144.

OS 138 includes a shell 140, for providing transparent user access to resources such as application programs 144. Generally, shell 140 is a program that provides an interpreter and an interface between the user and the operating system. More specifically, shell 140 executes commands that are entered into a command line user interface or from a file. Thus, shell 140, also called a command processor, is generally the highest level of the operating system software hierarchy and serves as a command interpreter. The shell provides a system prompt, interprets commands entered by keyboard, mouse, or other user input media, and sends the interpreted command(s) to the appropriate lower levels of the operating system (e.g., a kernel 142) for processing. Note that while shell 140 is a text-based, line-oriented user interface, the present invention will equally well support other user interface modes, such as graphical, voice, gestural, etc.

As depicted, OS 138 also includes kernel 142, which includes lower levels of functionality for OS 138, including providing essential services required by other parts of OS 138 and application programs 144, including memory management, process and task management, disk management, and mouse and keyboard management.

Application programs 144 include a renderer, shown in exemplary manner as a browser 146. Browser 146 includes program modules and instructions enabling a world wide web (WWW) client (i.e., computer 102) to send and receive network messages to the Internet using hypertext transfer protocol (HTTP) messaging, thus enabling communication with software deploying server 150 and other computer systems.

Application programs 144 in computer 102's system memory (as well as software deploying server 150's system memory) also include a service delivery system optimization program (SDSOP) 148. SDSOP 148 includes code for implementing the processes described below, including those described in FIG. 2. In one embodiment, computer 102 is able to download SDSOP 148 from software deploying server 150, including in an on-demand basis, wherein the code in SDSOP 148 is not downloaded until needed for execution to define and/or implement the improved enterprise architecture described herein. Note further that, in one embodiment of the present invention, software deploying server 150 performs all of the functions associated with the present invention (including execution of SDSOP 148), thus freeing computer 102 from having to use its own internal computing resources to execute SDSOP 148.

The hardware elements depicted in computer 102 are not intended to be exhaustive, but rather are representative to highlight essential components required by the present invention. For instance, computer 102 may include alternate memory storage devices such as magnetic cassettes, digital versatile disks (DVDs), Bernoulli cartridges, and the like. These and other variations are intended to be within the spirit and scope of the present invention.

Figure 2:
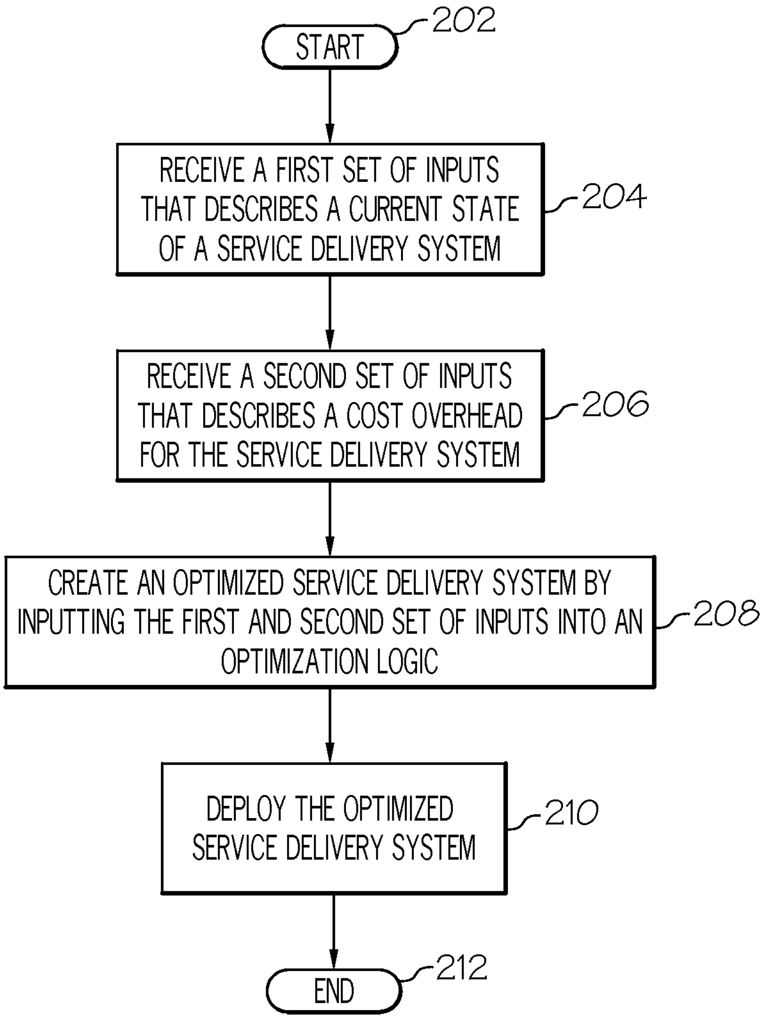
FIG. 2 is a high level flow chart of one or more exemplary steps performed by a processor to optimize a service delivery system.

With reference now to FIG. 2, a high level flow chart of one or more steps performed by a processor to optimize a service delivery system is presented. The process begins as initiator block 202, which may be prompted by a change to a service level agreement between a service delivery enterprise that owns and/or manages the service delivery system and one or more customers of the service being delivered, a change in the finances (e.g., available cash, change in overhead/salaries/etc., national/world economic conditions, etc.) of the service delivery enterprise, a turnover of personnel in the service delivery enterprise, etc. As described in block 204, a processor receives a first set of inputs that describes a current state of the service delivery system. More specifically, this current state describes human resources currently being used by the service delivery system. In one embodiment, these human resources are personnel of the service delivery system, while in other embodiments the human resources are some combination of full time personnel, part time personnel, contract workers, and/or workers from a third party. The set of inputs describes service areas of the service delivery system, skill levels of resources in each of the service areas, and predefined acceptable revenue levels for the service delivery system according to a current demand load on all of the service delivery system. That is, this set of inputs describes the number, type, location, etc. of multiple service areas that make up the service delivery system. This set of inputs also describes the skill level of each human resource and/or multiple human resources (up to and including all human resources) in each of the service areas. In addition, this set of inputs describes a minimum revenue level that the owner/manager of the service delivery system demands of each of the service areas and/or the entire service delivery system. In one embodiment, data described by this set of inputs comes from the database for service area 1 156 and/or the database for service area 2 158 shown in FIG. 1, which are components of an overall service delivery system. Databases 156 and 158 respectively describe the current state of the respective service areas that are supervised/controlled/managed by service area 1's supervisory computer 152 and service area 2's supervisory computer 154. That is, supervisory computers 152 and 154 monitor and adjust activities and resources in their respective service areas. Note that while only two service areas/supervisory computers are depicted in FIG. 1, it is understood that there may be many more service areas that make up the service delivery system.

As described in block 206, the processor also receives a second set of inputs (again from databases 156 and 158 via their respective supervisory computers 152/154) that describes a cost overhead for the service delivery system. In one embodiment, this cost overhead includes, but is not limited to, salaries of the resources in each of the service areas, hiring and initial training costs associated with each skill level of resources in each of the service areas, and retraining costs associated with retraining skilled resources in one of the service areas to work in order to become retrained skilled resources in another of the service areas.

As described in block 208, an optimization logic (e.g., SDSOP 148 shown in FIG. 1) is then implemented by the processor to optimize the service delivery system in order to derive an optimized service delivery system. In one embodiment, this optimization is performed by the first set of inputs described in block 204 to maximize a service delivery optimization formula such as the formula $$\sum_{i=1}^{n} v_i x_i,$$

where n=a count of how many said service areas are in the service delivery system, and where $v_i$=the first set of inputs for each of the service areas $x_i$. This formula allows for each of the service areas to be evaluated as to their current conditions.

In one embodiment, $$\sum_{i=1}^{n} v_i x_i$$

is subject to a constraint $$\sum_{i=1}^{n} w_i z_i x_i \le C,$$

where $w_i$=a separate weight given to each input $z_i$ from the second set of inputs, and where C=a maximum user-defined acceptable cost overhead for the optimized service delivery system. This constraint ensures that each (and/or all) of the service areas meet the predefined requirements of the owner/manager of the service delivery system.

In one embodiment, $$\sum_{i=1}^{n} v_i x_i$$

is also subject to a constraint $$\sum_{i=1}^{n} r_i > T,$$

where $r_i$ is a number of resources in each of the service areas, and wherein T is a user-defined minimum number of resources to be maintained in each of the service areas regardless of any current workload. Thus, if any service area has too few human resources to make it viable, then that service area may be eliminated, even if this affects the service provider's ability to meet the conditions of a service level agreement with a customer. This lack of viability may be due to having too few personnel in a large workspace (thus wasting rent/utility overhead), having too few personnel to justify having a manager to oversee their work, etc.

In one embodiment, the optimized service delivery system is created by realigning resources from the service areas in an initial version of the service delivery system. That is, if one service area has too many personnel of a particular skill set that is needed in another service area, then these personnel may be transferred to the other service area in need of such skilled personnel.

As described in block 210, the optimized service delivery system is then deployed. In one embodiment, this optimized service delivery system includes a resource training plan that identifies which resources need to be trained and deployed to specific service areas in order to create the optimized service delivery system. For example, the optimization logic may determine that in order for the optimized service delivery system to be realized, new or existing personnel may need to be trained in order to arrive at the optimized service delivery system.

In one embodiment, the optimized service delivery system utilizes a hiring plan that identifies which resources need to be hired and deployed to specific service areas in order to create the optimized service delivery system. Thus, a decision may need to be made as to whether it is more effective (in cost, efficiency, etc.) to hire new personnel or to retrain existing personnel to meet the requirement of having certain skills levels in the personnel. This decision process may be performed by a processor, in response to determining that the retraining costs are lower than the hiring and initial training costs, evicting the hiring and initial training costs from the second set of inputs and re-executing the formula $$\sum_{i=1}^{n} v_i x_i$$

under the constraint $$\sum_{i=1}^{n} w_i z_i x_i \le C$$

in order to obtain a new optimal service delivery system.

In one embodiment, multiple candidate service delivery systems are generated by utilizing the formula $$\sum_{i=1}^{n} v_i x_i$$

and the constraint $$\sum_{i=1}^{n} w_i z_i x_i \leq C.$$

These multiple candidate service delivery systems are the result of ranges of values found in the first and second set of inputs described above. For example, assume that predefined acceptable revenue levels from the first set of inputs have a range of $1M to $2M. By inputting these different values into the formula $$\sum_{i=1}^{n} v_i x_i,$$

different candidate service delivery systems will result.

These multiple candidate service delivery systems are then ranked according to which candidate service delivery system best meets service requirements of a predefined service level agreement at a lowest price. That is, the optimization logic described above will rank various candidate service delivery systems according to 1) how well they meet certain performance criteria, and 2) how cost effective they are. These two criteria may be judged on a sliding scale, since 1) and 2) may be conflicting. The processor can then select a highest ranked candidate service delivery system as the optimized service delivery system to be deployed.

In one embodiment, the processor, in response to determining that none of multiple candidate service delivery systems are able to meet the constraint $$\sum_{i=1}^{n} r_i > T,$$

will cancel the predefined service level agreement. Thus, if none of the candidate service delivery systems are able to make economic sense for the service delivery system's owner/manager to provide a service to a customer under a certain service level agreement, then that service level agreement may be abandoned before implementation, and/or cancelled if appropriate.

As described herein, a transformation of a service delivery system into an optimized service delivery system is based on careful trade-off analysis and scientific reasoning applied to a holistic view of the service delivery (SD) system, which existing enterprise resource planning (ERP) systems generally lack. That is, using existing ERP systems, changes are generally made based on limited analysis of system silos (e.g. individual service areas), which leads to inefficiencies in the overall SD system.

The system presented herein provides a comprehensive set of models and reasoning criteria that are employed by a service delivery transformation system (e.g., computer 102 shown in FIG. 1) to automatically optimize a given SD system and to address issues such as 1) which resources to retain and/or re-train, 2) how many resources to deploy in which service, 3) how many resources to hire, etc.

In one embodiment, the optimization process utilizes an input model and a demand model.

Input Models:

Input models describe the SD system model. The SD system is modeled as a set of service areas $s_1, \ldots, s_n$, in which each service area s employs a set of $N_p$ resources. A resource r employed in service area s may have skills in a set of other service areas S'. Each of the service areas S' have a capacity c, which represents the number of resources working in service area s. Min(s) m represents the minimum number of resources needed for service area s to sustain the service.

The input model also incorporates resources costs. Each resource is employed for a specific primary service area s, and thereby earns a salary sal(s) over a time window W. While different resources may earn different salaries in the same service area based on their relative levels of expertise, in one embodiment of the present disclosure an average salary level is used to describe salaries. In order to train the resource in another service area s', there is a training_cost(s,s'), which may include the cost of work disruption, personnel relocation costs, etc. In case a resource has expertise in multiple service areas, then the minimum training cost among all those areas may be considered. Thus, in order to hire a resource for service area s, there will be a hiring_cost(s), which includes the cost of advertising and posting job openings, screening applicants, etc.

Demand Model:

In one embodiment, an assumption is made that demand is captured over a time-window W in terms of a set of customer work orders (real or simulated), based on market inputs. Each work order is a set of tuples $\{C:<s_1:N>, \ldots <s_m,N_m>\}$, where C is the customer name and $<s:N>$ denotes that the work-order requires N resources from skill area s. A work order may consist of a single tuple, when the customer needs services from a single area. In one embodiment, a work order must be accepted/rejected in its entirety. With each work order W, there is a Revenue(R) which represents the revenue to be earned on completing W.

As described herein, optimizing a SD system is formulated as a problem in order to derive a new SD system configuration that maximize revenues while keeping costs $<K$. This optimization may be performed utilizing a variation of a knapsack problem, as described above with respect to block 208 in FIG. 2. A constraint on the problem may keep the number of resources in each service area above a threshold T, which represents the minimum number of resources for a service area and/or the entire service delivery system, and below which sustaining the service area does not make business sense. Additional goals met by the present disclosure include maximizing the number of distinct customers who can be serviced, maximizing the number of existing resources that can be retained, etc.

In one embodiment of the present invention, at each point in the optimization process a subset of work-orders can be evaluated, in order to determine the aggregate required capacity across all the service areas for these work orders. This allows a fine granularity in identifying any capacity gap/glut given a current capacity. Thus, the capacity gap is adjusted by moving resources from the capacity glut areas to the capacity scarce areas. In one embodiment, training/retraining of existing personnel, either within or outside of the service area in need of specific skill sets, is performed first, since costs associated with such training/retraining are usually less than the hiring costs for such resources. If still more resources are needed by a service area and/or the entire service delivery system, then the gap will be bridged through hiring. Note that if there is a glut of resources having unneeded skills in any service area after these adjustments, then the glut is removed by realigning resources. The process described herein thus results in a new (optimized) configuration of the overall service delivery system. By utilizing this new configuration, the total costs can be calculated as the training costs+hiring costs+salary, whose total is then determined as a value that is less than K. If so, then the derived optimized service delivery system is deemed to be a feasible solution. Finally, from all the ranked feasible candidate solutions, the one that best meets the other optimization goals is selected.

Given the input model and optimization criteria described herein, the output of the methodology described will include: an optimized SD system with a new distribution of resources across service areas; a training plan that identifies which resources should be trained and deployed in which area; a retraining plan in which multi-skilled people, who may be easier (less costly) to train in new areas, will get preferred training; and a hiring plan that states how many resources to hire for a given skill area in a service.

Thus, in one embodiment the process described herein takes as input a set of model inputs that capture the current state of the SD system in terms of service areas and resource distribution, resources and their skills, resource salary, training and retraining cost models, and the demand model of work orders. A second set of inputs include a set of user-specified goals and criteria for optimizing the SD system in terms of maximizing revenue, cost constraints, resource constraints etc. A heuristic analysis, such as that described above, searches the SD system space and determine the trade-offs for each possible configuration. Outputs of the analysis produce a new and more optimized system, along with a resource training plan, and a resource hiring plan, relevant to the desired goals and constraints.

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of various embodiments of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Note further that any methods described in the present disclosure may be implemented through the use of a VHDL (VHSIC Hardware Description Language) program and a VHDL chip. VHDL is an exemplary design-entry language for Field Programmable Gate Arrays (FPGAs), Application Specific Integrated Circuits (ASICs), and other similar electronic devices. Thus, any software-implemented method described herein may be emulated by a hardware-based VHDL program, which is then applied to a VHDL chip, such as a FPGA.

Having thus described embodiments of the invention of the present application in detail and by reference to illustrative embodiments thereof, it will be apparent that modifications and variations are possible without departing from the scope of the invention defined in the appended claims.

What is claimed is:

1. A computer implemented method of optimizing a service delivery system, the computer implemented method comprising:

a processor initiating an optimization of a service delivery system in response to a change to a service level agreement between a service delivery enterprise that owns and manages the service delivery system and one or more customers of the service being delivered, a change in financial conditions of the service delivery enterprise, and a turnover of personnel in the service delivery enterprise;

the processor receiving a first set of inputs that describes a current state of a service delivery system, wherein the set of inputs describes service areas of the service delivery system, skill levels of resources in each of the service areas, and predefined acceptable revenue levels for the service delivery system according to a current demand load on all of the service delivery system, and wherein the first set of inputs further describes the current state of the service delivery system in terms of service areas and resource distribution, resource salaries in the service delivery system, training and retraining cost models for the resources in each of the service areas, and a demand model of work orders for the service delivery system;

the processor receiving a second set of inputs that describes a cost overhead for the service delivery system, wherein the cost overhead comprises salaries of the resources in each of the service areas, hiring and initial training costs associated with each skill level of resources in each of the service areas, and retraining costs associated with retraining skilled resources in one of the service areas in order to become retrained skilled resources in another of the service areas;

the processor optimizing the service delivery system in order to derive an optimized service delivery system, wherein the optimized service delivery system is derived by utilizing the first set of inputs to maximize a service delivery optimization formula $$\sum_{i=1}^{n} v_i x_i$$

that utilizes variables n, $v_i$, and $x_i$, wherein n=a count of how many said service areas are in the service delivery system and $v_i$=the first set of inputs for each of the service areas $x_i$, and wherein the service delivery optimization formula $$\sum_{i=1}^{n} v_i x_i$$

is subject to a constraint $$\sum_{i=1}^{n} w_i z_i x_i \leq C,$$

wherein $w_i$=a separate weight given to each input $z_i$ from the second set of inputs, and wherein C=a maximum user-defined acceptable cost overhead for the optimized service delivery system, and wherein the service delivery optimization formula $$\sum_{i=1}^{n} v_i x_i$$

is subject to a constraint $$\sum_{i=1}^{n} r_i > T,$$

wherein $r_i$ is a number of resources in each of the service areas, and wherein T is a user-defined minimum number of resources to be maintained in each of the service areas regardless of any current workload; and the processor issuing instructions to deploy the optimized service delivery system.

2. The computer implemented method of claim 1, further comprising:

the processor realigning resources from a first service area to a second service area in order to create the optimized service delivery system.

3. The computer implemented method of claim 1, further comprising:

the processor establishing a resource training plan that identifies which resources need to be trained and deployed to specific service areas in order to create the optimized service delivery system.

4. The computer implemented method of claim 1, further comprising:

the processor establishing a hiring plan that identifies which resources need to be hired and deployed to specific service areas in order to create the optimized service delivery system.

5. The computer implemented method of claim 1, further comprising:

the processor, in response to determining that the retraining costs are lower than the hiring and initial training costs, evicting the hiring and initial training costs from the second set of inputs and re-executing the service delivery optimization formula $$\sum_{i=1}^{n} v_i x_i$$

under the constraint $$\sum_{i=1}^{n} w_i z_i x_i \leq C$$

to obtain a new optimal service delivery system.

6. The computer implemented method of claim 1, further comprising:

the processor generating multiple candidate service delivery systems by utilizing the service delivery optimization formula $$\sum_{i=1}^{n} v_i x_i$$

and the constraint $$\sum_{i=1}^{n} w_i z_i x_i \leq C;$$

the processor ranking the multiple candidate service delivery systems according to which candidate service delivery system best meets service requirements of a predefined service level agreement at a lowest price; and the processor selecting a highest ranked candidate service delivery system, from the multiple candidate service delivery systems, as being the optimized service delivery system.

7. The computer implemented method of claim 6, further comprising:

the processor determining that none of the multiple candidate service delivery systems are able to meet the constraint $$\sum_{i=1}^{n} r_i > T;$$

and the processor, in response to determining that none of the multiple candidate service delivery systems are able to meet the constraint $$\sum_{i=1}^{n} r_i > T,$$

cancelling the predefined service level agreement.

8. A computer program product for optimizing a service delivery system, the computer program product comprising:

a non-transitory computer readable storage medium having encoded and stored thereon;

first program instructions executable by a processor to cause the processor to receive a first set of inputs that describes a current state of a service delivery system, wherein the set of inputs describes service areas of the service delivery system, skill levels of resources in each of the service areas, and predefined acceptable revenue levels for the service delivery system according to a current demand load on all of the service delivery system;

second program instructions executable by the processor to cause the processor to receive a second set of inputs that describes a cost overhead for the service delivery system, wherein the cost overhead comprises salaries of the resources in each of the service areas, hiring and initial training costs associated with each skill level of resources in each of the service areas, and retraining costs associated with retraining skilled resources in one of the service areas in order to become retrained skilled resources in another of the service areas; and third program instructions executable by the processor to cause the processor to optimize the service delivery system in order to derive an optimized service delivery system, wherein the optimized service delivery system is derived by utilizing the first set of inputs to maximize a service delivery optimization formula $$\sum_{i=1}^{n} v_i x_i,$$

where n=a count of how many said service areas are in the service delivery system, $v_i$=the first set of inputs for each of the service areas $x_i$ , and wherein the service delivery optimization formula $$\sum_{i=1}^{n} v_i x_i$$

is subject to a constraint $$\sum_{i=1}^{n} w_i z_i x_i \le C,$$

wherein $w_i$=a separate weight given to each input $z_i$ from the second set of inputs, and wherein C=a maximum user-defined acceptable cost overhead for the optimized service delivery system, and wherein the service delivery optimization formula $$\sum_{i=1}^{n} v_i x_i$$

is subject to a constraint $$\sum_{i=1}^{n} r_i > T,$$

wherein $r_i$ is a number of resources in each of the service areas, and wherein T is a user-defined minimum number of resources to be maintained in each of the service areas regardless of any current workload.

9. The computer program product of claim 8, further comprising:

fourth program instructions executable by the processor to cause the processor to realign resources from the service areas in an initial version of the service delivery system in order to create the optimized service delivery system; and wherein the fourth program instructions are stored on the computer readable storage media.

10. The computer program product of claim 8, further comprising:

fourth program instructions executable by the processor to cause the processor to establish a hiring plan that identifies which resources need to be hired and deployed to specific service areas in order to create the optimized service delivery system; and wherein the fourth program instructions are stored on the computer readable storage media.

11. The computer program product of claim 8, further comprising:

fourth program instructions executable by the processor to cause the processor to establish a resource training plan that identifies which resources need to be trained and deployed to specific service areas in order to create the optimized service delivery system; and wherein the fourth program instructions are stored on the computer readable storage media.

12. The computer program product of claim 8, further comprising:

fourth program instructions executable by the processor to cause the processor to, in response to determining that the retraining costs are lower than the hiring and initial training costs, evict the hiring and initial training costs from the second set of inputs and re-executing the service delivery optimization formula $$\sum_{i=1}^{n} v_i x_i$$

under the constraint $$\sum_{i=1}^{n} w_i z_i x_i \le C$$

to obtain a new optimal service delivery system; and wherein the fourth program instructions are stored on the computer readable storage media.

13. The computer program product of claim 8, further comprising:

fourth program instructions executable by the processor to cause the processor to generate multiple candidate service delivery systems by utilizing the service delivery optimization formula $$\sum_{i=1}^{n} v_i x_i$$

and the constraint $$\sum_{i=1}^{n} w_i z_i x_i \leq C;$$

fifth program instructions executable by the processor to cause the processor to rank the multiple candidate service delivery systems according to which candidate service delivery system best meets service requirements of a predefined service level agreement at a lowest price; and sixth program instructions executable by the processor to cause the processor to select a highest ranked candidate service delivery system, from the multiple candidate service delivery systems, as being the optimized service delivery system; and wherein the fourth, fifth, and sixth program instructions are stored on the computer readable storage media.

14. The computer program product of claim 13, further comprising:

seventh program instructions executable by the processor to cause the processor to, in response to determining that none of multiple candidate service delivery systems are able to meet the constraint $$\sum_{i=1}^{n} r_i > T,$$

cancel the predefined service level agreement; and wherein the seventh program instructions are stored on the computer readable storage media.

15. A computer system comprising:

a processor, a computer readable memory, and a computer readable storage media;

first program instructions to receive a first set of inputs that describes a current state of a service delivery system, wherein the set of inputs describes service areas of the service delivery system, skill levels of resources in each of the service areas, and predefined acceptable revenue levels for the service delivery system according to a current demand load on all of the service delivery system;

second program instructions to receive a second set of inputs that describes a cost overhead for the service delivery system, wherein the cost overhead comprises salaries of the resources in each of the service areas, hiring and initial training costs associated with each skill level of resources in each of the service areas, and retraining costs associated with retraining skilled resources in one of the service areas in order to become retrained skilled resources in another of the service areas; and third program instructions to optimize the service delivery system in order to derive an optimized service delivery system, wherein the optimized service delivery system is derived by utilizing the first set of inputs to maximize a service delivery optimization formula $$\sum_{i=1}^{n} v_i x_i,$$

where n=a count of how many said service areas are in the service delivery system, $v_i$=the first set of inputs for each of the service areas $x_i$, and wherein $$\sum_{i=1}^{n} v_i x_i$$

is subject to a constraint $$\sum_{i=1}^{n} w_i z_i x_i \leq C,$$

wherein $w_i$=a separate weight given to each input $z_i$ from the second set of inputs, and wherein C=a maximum user-defined acceptable cost overhead for the optimized service delivery system, and wherein the service delivery optimization formula $$\sum_{i=1}^{n} v_i x_i$$

is subject to a constraint $$\sum_{i=1}^{n} r_i > T,$$

wherein $r_i$ is a number of resources in each of the service areas, and wherein T is a user-defined minimum number of resources to be maintained in each of the service areas regardless of any current workload; and wherein the first, second, and third program instructions are stored on the computer readable storage media for execution by the CPU via the computer readable memory.

16. The computer system of claim 15, further comprising:

fourth program instructions to realign resources from the service areas in an initial version of the service delivery system in order to create the optimized service delivery system; and wherein the fourth program instructions are stored on the computer readable storage media for execution by the CPU via the computer readable memory.

17. The computer system of claim 15, further comprising:

fourth program instructions to, in response to determining that the retraining costs are lower than the hiring and initial training costs, evict the hiring and initial training costs from the second set of inputs and re-executing the service delivery optimization formula $$\sum_{i=1}^{n} v_i x_i$$

under the constraint $$\sum_{i=1}^{n} w_i z_i x_i \le C$$

to obtain a new optimal service delivery system; and wherein the fourth program instructions are stored on the computer readable storage media for execution by the CPU via the computer readable memory.

18. The computer system of claim 15, further comprising:

fourth program instructions to generate multiple candidate service delivery systems by utilizing the service delivery optimization formula $$\sum_{i=1}^{n} v_i x_i$$

and the constraint $$\sum_{i=1}^{n} w_i z_i x_i \le C;$$

fifth program instructions to rank the multiple candidate service delivery systems according to which candidate service delivery system best meets service requirements of a predefined service level agreement at a lowest price; and sixth program instructions to select a highest ranked candidate service delivery system, from the multiple candidate service delivery systems, as being the optimized service delivery system; and wherein the fourth, fifth, and sixth program instructions are stored on the computer readable storage media for execution by the CPU via the computer readable memory.

19. The computer system of claim 18, further comprising:

seventh program instructions to, in response to determining that none of multiple candidate service delivery systems are able to meet the constraint $$\sum_{i=1}^{n} r_i > T,$$

cancel the predefined service level agreement; and wherein the seventh program instructions are stored on the computer readable storage media for execution by the CPU via the computer readable memory.

* * * * *